(12) United States Patent
Neumann et al.

(10) Patent No.: US 12,130,766 B2
(45) Date of Patent: Oct. 29, 2024

(54) PROTOCOL INDICATOR FOR DATA TRANSFER

(71) Applicant: Sandisk Technologies, Inc., Milpitas, CA (US)

(72) Inventors: Charles Neumann, Lake Forest, CA (US); Mia Ryan, San Jose, CA (US)

(73) Assignee: Sandisk Technologies, Inc., Milpitas, CA (US)

(*) Notice: Subject to any disclaimer, the term of this patent is extended or adjusted under 35 U.S.C. 154(b) by 16 days.

(21) Appl. No.: 17/714,446

(22) Filed: Apr. 6, 2022

(65) Prior Publication Data

US 2023/0325338 A1 Oct. 12, 2023

(51) Int. Cl.
*G06F 13/40* (2006.01)
*G06F 13/42* (2006.01)

(52) U.S. Cl.
CPC ...... *G06F 13/4068* (2013.01); *G06F 13/4282* (2013.01); *G06F 2213/0042* (2013.01)

(58) Field of Classification Search
CPC ............ G06F 13/4068; G06F 13/4282; G06F 2213/0042
USPC ............................. 710/8, 11, 15, 33, 62, 105
See application file for complete search history.

(56) References Cited

U.S. PATENT DOCUMENTS

| | | | | |
|---|---|---|---|---|
| 5,577,201 A * | 11/1996 | Chan | ................... | G06F 11/2221 714/E11.186 |
| 6,285,659 B1 * | 9/2001 | Feuerstraeter | ........ | H04L 1/0002 714/704 |
| 7,340,363 B2 * | 3/2008 | Tsai | ....................... | G01R 31/67 702/182 |
| 8,601,173 B2 * | 12/2013 | Sung | ...................... | H04Q 1/136 710/62 |
| 9,608,386 B2 | 3/2017 | Jenkins et al. | | |
| 9,619,979 B1 * | 4/2017 | Montero | ................. | H04L 69/03 |
| 10,055,325 B2 | 8/2018 | Montero et al. | | |
| 10,317,434 B2 | 6/2019 | Jenkins et al. | | |
| 11,132,309 B2 * | 9/2021 | Ryu | .................... | G06F 13/1668 |
| 11,688,981 B2 * | 6/2023 | Kulkarni | ............ | H01R 13/6683 439/620.21 |
| 2004/0066790 A1 * | 4/2004 | Valavi | ..................... | H04L 69/18 370/465 |
| 2005/0080935 A1 * | 4/2005 | Fukae | ................. | G06F 13/4045 710/1 |
| 2007/0030854 A1 * | 2/2007 | Lin | ........................ | H04L 45/22 340/3.1 |
| 2008/0204992 A1 | 8/2008 | Swenson et al. | | |
| 2009/0083234 A1 | 3/2009 | Yeom et al. | | |
| 2009/0248924 A1 * | 10/2009 | Melin | ..................... | H04L 12/66 710/63 |
| 2012/0233368 A1 * | 9/2012 | Alshinnawi | ........... | G06F 13/387 710/301 |
| 2012/0297207 A1 * | 11/2012 | Carlsen | ............... | G06F 13/4081 713/300 |

(Continued)

*Primary Examiner* — Idriss N Alrobaye
*Assistant Examiner* — Henry W Yu
(74) *Attorney, Agent, or Firm* — Chang & Hale LLP

(57) ABSTRACT

Systems and methods are disclosed for providing an indication of the data transfer protocol that is operative during a data transfer operation between a data storage device capable of supporting a plurality of data transfer protocols and a host computer. A protocol controller of the data storage device is configured to determine a data transfer protocol based on a data cable used and to generate a selector signal used to provide the indication.

20 Claims, 4 Drawing Sheets

(56) References Cited

U.S. PATENT DOCUMENTS

| | | |
|---|---|---|
| 2015/0370751 A1 | 12/2015 | Perrine et al. |
| 2016/0117278 A1* | 4/2016 | Bell ..................... G06F 13/387 |
| | | 710/11 |
| 2017/0220444 A1 | 8/2017 | Montero et al. |
| 2017/0286360 A1 | 10/2017 | Srivastava |
| 2018/0003743 A1* | 1/2018 | Jenkins ............. G01R 19/1659 |
| 2018/0329844 A1* | 11/2018 | Worley ................ G06F 13/385 |
| 2020/0287334 A1* | 9/2020 | Kulkarni ................ H01R 13/64 |

* cited by examiner

PROTOCOL INDICATOR FOR DATA TRANSFER

BACKGROUND

There may be no reliable way for a typical user to determine which of multiple possible data interface protocols is being used by a host-peripheral connection during a data transfer. When the cable used between the host computer and the peripheral device for the data transfer resembles the cables of multiple different data protocols, the appearance of the cable may not provide a clear indication of the protocol being used. In such cases, the user may not be aware that an incorrect cable is being used for a desired protocol and an expected data transfer performance.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to data transfer between a host and a data storage device.

Overview

Transferring data between a host computer and a data storage device can take place over a physical interface device, such as a cable. However, similar cables may be used for multiple different data transfer protocols. Additionally, the host computer as well as the data storage device may be capable of multiple different data transfer protocols. It may not be clear to the user which of the multiple data transfer protocols is being used during a transfer. Since the speed of data transfer is dependent on the transfer protocol used, an indication of the data transfer protocol in use can be helpful to determine whether the appropriate cable is being used for a desired protocol.

Certain embodiments disclosed herein provide for an indicator (such as a visual indicator, for example) on a data storage device/drive that indicates to the user which of multiple data transfer protocols is in use during a data transfer between a host computer and the data storage device/drive. Such solutions may better inform the user of the protocol in use and thus the expected performance during the data transfer compared to systems without such indicators. The terms "data storage device" and "data storage drive" are used herein according to their broad and ordinary meaning and may be used substantially interchangeably in certain contexts herein.

The solutions presented herein may provide for simplified data transfer processes compared to certain alternative systems. For example, an indication on a data storage device that shows a first protocol is in use (such as a USB3.x connection, for example) can indicate to the user that a data transfer with a known maximum transfer rate is in process. Should the user desire a different protocol instead, with a faster data transfer capability (such as a Thunderbolt3 connection, for example), the user may be able to initiate the second protocol by taking certain actions, including using a different data cable that is rated for that protocol.

Data Transfer System

Figure 1:
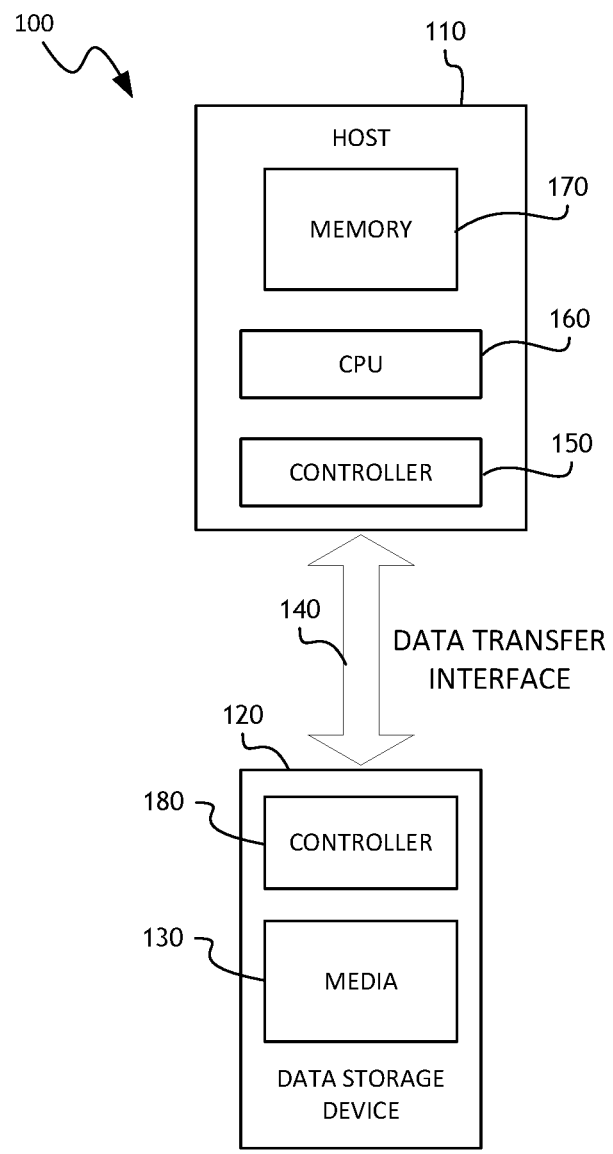
FIG. 1 is a block diagram of a data transfer system according to one or more embodiments.

FIG. 1 is a block diagram illustrating an embodiment of a data transfer system 100. The data transfer system 100 includes a host computer 110 and at least one data storage device 120, wherein the data storage device 120 includes data storage media 130. In certain situations, it may be desirable to perform data transfer operations and/or data storage operations between the host computer 110 and the storage media 130 of the data storage device 120. For example, such data transfer/storage operations may include copying, transferring, synchronizing, or otherwise exchanging data between a memory 170 of the host computer 110 and the storage media 130 of the data storage device 120.

In the system 100, the data storage device 120 is coupled to the host computer 110 via a communications interface 140. The host computer 110 may include a host controller 150 configured to execute data storage access commands with the data storage device 120 over the interface 140. The commands may be coordinated by the central processing unit (CPU) 160 of the host computer 110. In some cases, for instance when using a Peripheral Component Interconnect Express (PCIe) interface protocol, the host computer 110 may bypass the host controller 150 during data transfer over the interface 140. In such cases, the CPU 160 may coordinate the data transfer over the interface 140.

In various embodiments, the data storage device 120 includes one or more non-volatile memory components. In one embodiment, the data storage device 120 includes a Solid State Drive (SSD). In another embodiment, the data storage device 120 incudes a hybrid drive including flash memory and rotating magnetic storage media. The disclosure herein is applicable to SSD and hybrid implementations, and also the data storage device 120 could consist solely of rotating magnetic storage media, including RAID devices or other storage devices such as tape drives, hard disk drives (HDDs) and so forth. However, for the sake of simplicity, the various embodiments are described with reference to SSD-based implementations.

In various examples, the data storage device 120 may be an internal mass storage device associated with the host computer 110, a peripheral on a network corresponding to the host computer 110, an external data storage device coupled to the host computer 110, or the like. In any case, the data storage device 120 may be communicatively coupled to the host computer 110 via the communications interface 140 using one of multiple different data transmission protocols. In certain embodiments, the data storage device 120 may include controller circuitry 180 (e.g., protocol controller 180), which may be desirable to coordinate data transfers with the host computer 110, according to the selected transmission protocol. In certain embodiments, the protocol controller 180 of the data storage device 120 comprises one or more processors and/or memory modules, and may provide relatively low-level processing capability as compared to that of a host computer 110 to which the data storage device 120 may be coupled. As discussed below, in various examples, the controller 180 may be configured to receive an operation initiation command from a user interface of the data storage device 120 and to determine a data transfer protocol and generate a corresponding selector signal in response to the operation initiation command.

In various examples, the communications interface 140 comprises a data cable that is user installable and removable. In other embodiments, the communications interface 140 comprises a data cable that is intended to be installed permanently, or at least remain over a long-duration of service, as part of the data transfer system 100. In alternate embodiments, the communications interface 140 includes a wireless data connection configured for use with one or more of multiple different wireless data transmission protocols.

Data Transfer Protocol Indicator

Figure 2:
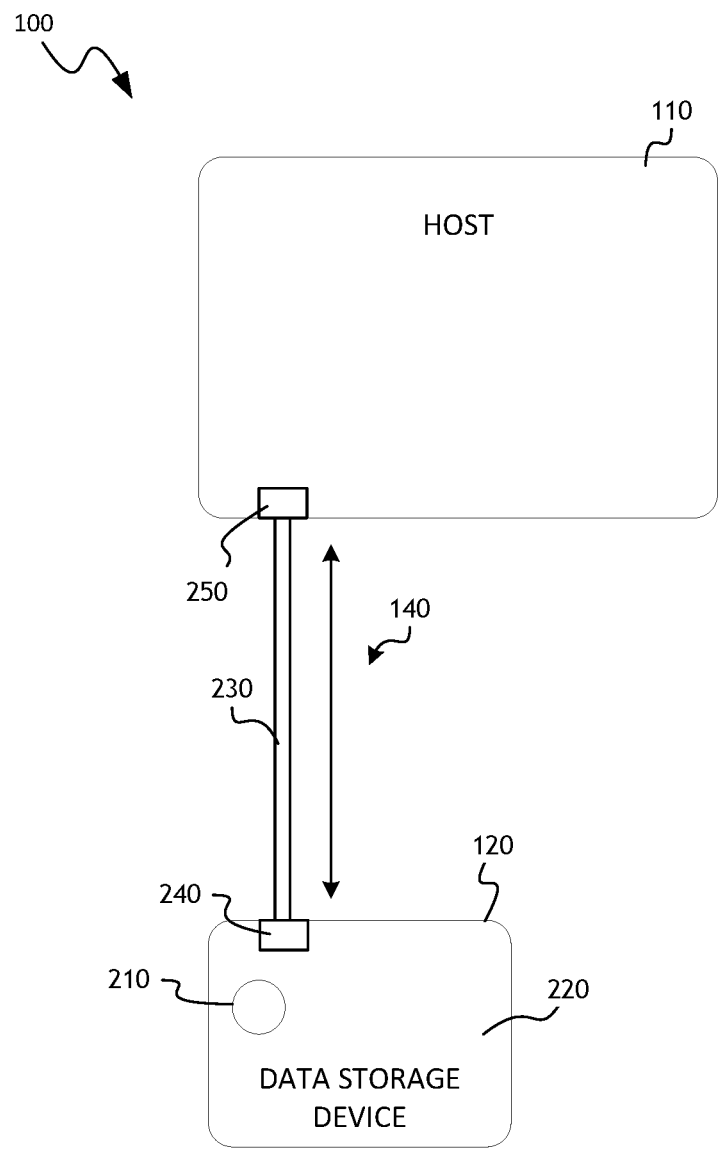
FIG. 2 is a physical diagram of a data transfer system according to one or more embodiments.

FIG. 2 is a block diagram of an example data transfer system 100 according to one or more embodiments. The block diagram illustrates some details of an example system 100, including one or more user-observable attributes of the data transfer system 100. For example, the data storage device 120 can include one or more user-observable indicators 210 disposed at a portion of a physical enclosure 220 of the data storage device 120. The one or more indicators 210 may be coupled to an outer portion or a surface of the enclosure 220, for instance. Alternately, the data storage device 120 can include one or more indicators 210 within the enclosure 220 of the data storage device 120 that may still be user-observable from without the enclosure 220. For instance, the one or more indicators 210 may be user-observable through a window, an opening, a translucent or transparent portion of the enclosure 220, or the like. The one or more indicators 210 may be visible (e.g., visually observed), or in some examples they may also include tactile, audible, or other user-observable properties.

The example data transfer system 100 includes a host computer 110 and at least one data storage device 120, as described with reference to FIG. 1. As shown in the illustration of FIG. 2, the host computer 110 can be coupled to the data storage device 120 via a communications interface 140, which can include a user-removable cable 230. Alternately, the host computer 110 may be coupled to the data storage device 120 via other forms of communications interface 140, as described above. In an example, the user-removable cable 230 can be plugged into a receptacle 240, or the like, at the data storage device 120. The receptacle 240 can also be a component of the communications interface 140. The cable 230 may also be plugged into a receptacle 250 at the host computer 110.

In an embodiment, the receptacle 240 comprises a Type-C receptacle, configured to receive a Type-C connector. In an example, the cable 230 includes a Type-C connector at least at one end that can be inserted into the receptacle 240. The Type-C receptacle/connector is multi-lane capable and is used for a variety of connection types, is compact, and is reversible. For example, some connection types that can use a Type-C receptacle/connector include Universal Serial Bus (USB) series 3.x and 4.x, Thunderbolt™ 3 and Thunderbolt™ 4, Peripheral Component Interconnect express (PCIe), and some DisplayPort modes. In some examples, the data storage device 120 is capable of data transfers using data transfer protocols associated with each of the above connection types. Additional connection types and associated protocols that can be used (or may be developed) for the Type-C receptacle/connector are also included in the disclosure.

While various data connection types are associated with a Type-C receptacle/connector, the corresponding connection and data transfer protocols are not the same. Further, the data transfer rates can vary between the connection types. For example, USB 3.0 and 3.1 have data transfer rates of 5 Gbps and 10 Gbps, respectively. In contrast, Thunderbolt™ 3 has a data transfer rate of 40 Gbps. An even larger contrast is USB2, where the data transfer rate is only 480 Mbps. In many cases, the cable 230 used for the connection will determine the connection type and the corresponding data transfer protocols, as well as the transfer speed. In other words, although multiple data transfer protocols and speeds are supported and available at the data storage device 120, the choice of the data cable 230 used during a connection can determine which protocol and transfer speed is operational for the given connection. While various data cables 230 may include a Type-C connector, the wiring and construction of the cables 230 can be different, and can be specific to the various connections and protocols. Accordingly, the various data cables 230 may not be electrically interchangeable, even though they are mechanically interchangeable.

Many users are knowledgeable enough to know what performance level is expected for a specific protocol. However, if the wrong Type-C cable 230 is inadvertently used at the data storage device 120, the user's performance expectations may not be met. Type-C cables 230 can look nearly identical regardless of the corresponding connection and protocol type. This increases the likelihood that a wrong cable 230 may be used for a desired data transfer connection. For example, using a USB cable 230 in place of a Thunderbolt™ cable 230 will result in a lower than expected performance, because the interface 140 will drop to USB levels instead of operating at the Thunderbolt™ levels.

In various embodiments, the data storage device 120 causes at least one indicator 210 to be activated in response to a cable 230 being plugged into the receptacle 240 and a data transfer being initiated. A data transfer may be initiated when a user (for example) inputs an operation initiation input signal or command at some user interface of the data storage device 120 or the host computer 110, or another interface that is configured to transmit an input to the data transfer system 100. For instance, after plugging the cable 230 into the host computer 110 and the data storage device 120, the user can initiate a data transfer initiation input signal or command to the data transfer system 100 to begin the data transfer. In the embodiments, one or more indicators 210 are configured to indicate or to display which one of the multiple possible data transfer protocols is being used and/or initiated.

For instance, an indicator 210 may be configured to illuminate in a specific color in response to a particular data transfer protocol being used/initiated. The indicator 210 may be capable of displaying various colors, for instance, where each color corresponds to one of the possible data transfer protocols that the data storage device 120 can support. In an example, the indicator 210 can be an illuminating component (such as a light emitting diode (LED), for example) capable of illuminating in various different colors. In another example, multiple illuminating components (such as LEDs)

of various colors may be used, where one or more of the multiple illuminating components are illuminated in response to a particular data transfer protocol being used/initiated. An indicator 210 can display a single illuminating indication that is a combination of the multiple illuminating components (for example a color produced by the combination of the multiple illuminating components) or each of the multiple illuminating components may be discretely displayed. It is also possible to use different flashing rates at the one or more indicators 210 to indicate the speed of the data transfer, for example, a faster rate would indicate a higher data transfer rate. In any case, the display at the one or more indicators 210 in response to the particular data transfer protocol being used/initiated can be directly associated with the one particular data transfer protocol being used/initiated, to clearly communicate such to the user.

For example, a first indicator 210 may activate in a first state (for instance by illuminating a first color) when a cable 230 corresponding to a USB protocol is plugged into the receptacle 240 and a data transfer using the USB protocol is initiated at the data storage device 120. The first indicator 210 may activate in a second state (for instance by illuminating a second color) when a cable 230 corresponding to a Thunderbolt™ protocol is plugged into the receptacle 240 and a data transfer using the Thunderbolt™ protocol is initiated at the data storage device 120. Further, the indicator 210 may provide additional granularity by activating in one of multiple states (for instance by illuminating one or more different colors) to indicate versions of the data transfer protocols being used (e.g., 1.x, 2.x, 3.x, 4.x, etc.), data transfer lanes being used by the interface 140, and so forth. Multiple or additional user-observable indicators 210 can be useful to indicate each of the above examples as well. For instance a second indicator 210 can be used to indicate the use of a second protocol or a second protocol version, a third indicator 210 can be used to indicate the use of a third protocol or a third protocol version, and so forth. Multiple indicators 210 may have the same colors or have different colors, and can also be used to indicate lanes used and other useful information. For clarity, a single data transfer protocol (or protocol version, if applicable) is indicated by the at least one indicator 210 at a given time. Different data transfer protocols may be indicated during different operations or at different periods of time, as discussed herein, but multiple data transfer protocols (or protocol versions, if applicable) will not be indicated simultaneously by an indicator 210.

Alternately or additionally, the indicator 210 may include a readable display. Such a readable display may comprise a Liquid Crystal Display (LCD) display, an LED display, or other screen or readable display. The readable display may use words, symbols, or other characters to indicate the particular data transfer protocol being used/initiated at the data storage device 120, and may include version and lane information as well as other useful information. Further, the indicator 210 may include a speaker or other transducer to provide audible and/or tactile indication of the particular data transfer protocol being used/initiated. Other indication techniques known in the art are also within the scope of the disclosure.

Figure 3:
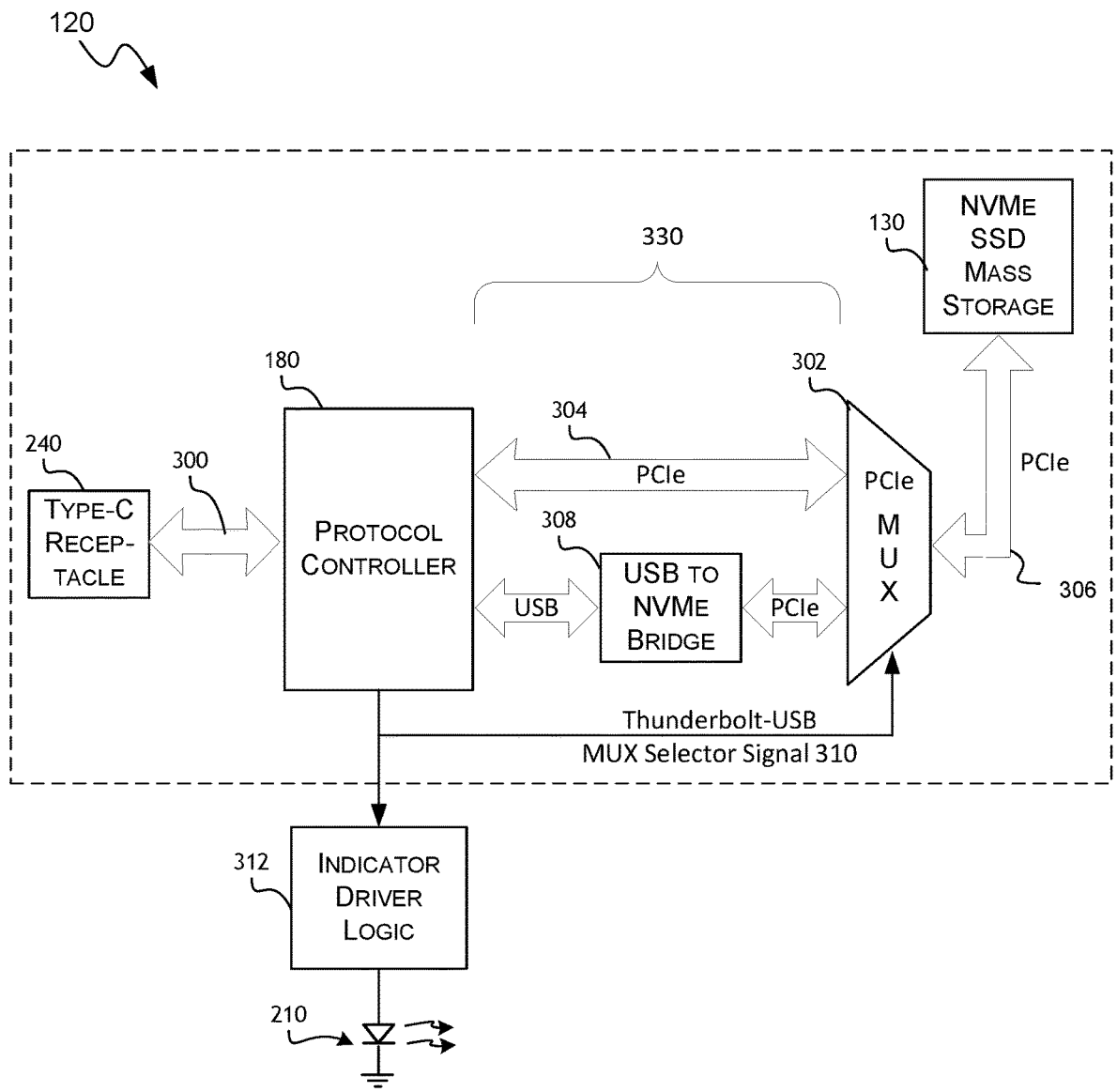
FIG. 3 is a schematic diagram of a data storage device according to one or more embodiments.

FIG. 3 is a schematic block diagram illustrating an example data storage device 120, according to various embodiments. The illustration shows an embodiment with specific application to USB and Thunderbolt™ components and protocols, but this is for discussion purposes and is not intended to be limiting. In the various embodiments, any of a variety of connection types, including their associated components and protocols, can be substituted and are within the scope of the disclosure. For instance, the data storage device 120 includes a Type-C receptacle 240 as an input/output data port. The receptacle 240 can also comprise other types of connectors. The illustration of a Type-C connector shows an example wherein similar cables 230 may be used that are specific to different connection types and protocols, as discussed above. Further, other data protocols that use a Type-C connection (as discussed above) are within the scope of the disclosure and may be used in the example illustrated in FIG. 3.

The receptacle 240 is communicatively coupled (via data bus 300) to a protocol controller 180 (e.g., controller 180 as shown at FIG. 1) that sets the protocol for the data transfer based on the cable 230 that is inserted into the receptacle 240. For instance, if a Thunderbolt™ cable 230 is plugged into the receptacle 240, then the protocol controller 180 selects a Thunderbolt™ protocol for the data transfer, which includes Thunderbolt™ specific attributes including transfer rate or speed, error checking and handling, and so forth. The protocol controller 180 also routes incoming data to a multiplexer (MUX) 302 that supports multiple protocol multiplex logic, via a data bus 304 (which may comprise a PCIe bus, for example), as shown at FIG. 3. The data bus 304 comprises one of multiple data paths 330 from the protocol controller 180 to the multiplexer 302. In various embodiments, the quantity of data paths 330 corresponds to the quantity of data transfer protocols that the data storage device 120 can support. Each data transfer protocol supported by the data storage device 120 can have a data path 330 and a channel at the multiplexer 302.

The multiplexer 302 passes the incoming data from the data bus 304 to a mass storage component 130 (e.g., media 130 as shown at FIG. 1) of the data storage device 120 via another data bus 306 (which may also comprise a PCIe bus, for example). The mass storage component 130 may comprise a Non-volatile Memory express (NVMe) Solid State Drive (SSD), another type of SSD, a hybrid drive, or the like. In some examples, the mass storage component 130 may comprise multiple device/drives, some of which may be local or remote to the enclosure 220. Outgoing data from the mass storage component 130 to the receptacle 240, and on to the host computer 110 follows the same path in a reverse direction.

If a USB cable 230 is plugged into the receptacle 240 instead, then the protocol controller 180 selects a USB protocol for the data transfer, which includes USB specific attributes including transfer rate or speed, error checking and handling, and so forth. The protocol controller 180 routes incoming USB data to the multiplexer 302 using another of the data paths 330. As shown at FIG. 3, the protocol controller 180 routes the incoming data via a transfer bridge 308 that enables the mass storage component 130 to read the incoming data. For example, the bridge 308 can re-configure the USB data to a PCIe format, an NVMe format, or other applicable format to conform to the on-board mass storage component 130. The multiplexer 302 passes the incoming data to the mass storage component 130 (e.g., media 130) of the data storage device 120 via the data bus 306.

Outgoing data from the mass storage component 130 to the receptacle 240, and on to the host computer 110, follows the same path in a reverse direction. In the example, when a USB cable 230 is being used, the bridge 308 reconfigures the outgoing data to a USB protocol configuration before sending the outgoing data to the receptacle 240, by way of the protocol controller 180. In alternative implementations, the protocol controller 180 may be capable of handling more than two different protocols. In the implementation, additional data paths 330 from the protocol controller 180 to the multiplexer 302 may be present to manage additional data types. Additional bridges 308 may also be used in the additional paths 330 for re-configuring data of the additional data types to PCIe format, or otherwise to conform to the data format of the mass storage component 130.

As shown at FIG. 3, the protocol controller 180 also generates a MUX selector signal 310 to select the channel of the multiplexer 302 that corresponds to the data transfer protocol determined by the protocol controller 180. For example, when a Thunderbolt™ cable 230 is plugged into the receptacle 240 and the protocol controller 180 selects a Thunderbolt™ protocol for the data transfer, the protocol controller 180 also generates a MUX selector signal 310 that corresponds to the Thunderbolt™ data path through the multiplexer 302. Alternately, when a USB cable 230 is plugged into the receptacle 240 and the protocol controller 180 selects a USB protocol for the data transfer, the protocol controller 180 generates a MUX selector signal 310 that corresponds to the USB data path through the multiplexer 302 (and including the bridge 308), and so forth. The MUX selector signal 310 is received by the multiplexer 302 to determine the channel of the multiplexer 302 and the data path 330 corresponding to the selected data protocol.

Accordingly, the protocol controller 180 includes logic configured to generate a MUX selector signal 310 corresponding to each of the data transfer protocols supported by the data storage device 120. As shown at FIG. 3, the MUX selector signal can also be used to activate an indicator 210 to a state corresponding to the selected data transfer protocol. In various embodiments, one or more indicators 210 are activated by the MUX selector signal 310 generated by the logic of the protocol controller 180. In the implementation shown at FIG. 3, indicator driver logic component 312 receives the MUX selector signal 310 and activates the indicator 210 to one of multiple states, based on the transfer protocol selected by the protocol controller 180.

In one example, the indicator driver logic component 312 may comprise a single transistor, acting as a switch. In the example, the indicator 210 may have a default state, comprising an off-state or a first on-state, for instance. The off-state or first on-state may be indicative of a first data transfer protocol (such as a Thunderbolt™ protocol, for instance). When a USB cable 230 is plugged into the receptacle 240, then the protocol controller 180 selects a USB protocol for the data transfer and generates the MUX selector signal 310 that corresponds to the USB data path through the multiplexer 302 (and including the bridge 308). The MUX selector signal 310 can be routed to the indicator driver logic 312 also. The MUX selector signal 310 may turn on the transistor and illuminate the indicator 210 to a second state, which may include illuminating at a different color, intensity, or the like, to indicate the use of the USB protocol.

In other examples, the indicator driver logic component 312 may comprise more components and/or more complex logic. For instance, the indicator driver logic component 312 may be capable of generating a unique output in response to the MUX selector signal 310 comprising a digital string or an analog value having multiple possible values. In one example the indicator driver logic component 312 comprises a series of transistors, capacitors, and/or switch components, or the like. In another example, the indicator driver logic component 312 comprises a simple digital to analog converter (DAC) or a similar circuit. In a further example, the indicator driver logic component 312 comprises a programmable component, such as an application-specific integrated circuit (ASIC), a field programmable gate array (FPGA), a microcontroller, or like component. In the examples, the indicator 210 may comprise an illuminating component capable or multiple display states, more than one illuminating component, a readable display, or the like (as discussed above). In the examples, the indicator driver logic 312 interprets the MUX selector signal 310 corresponding to the selected data transfer protocol and activates the indicator 210 accordingly to display the indication to the user.

Data Transfer Processes

Figure 4:
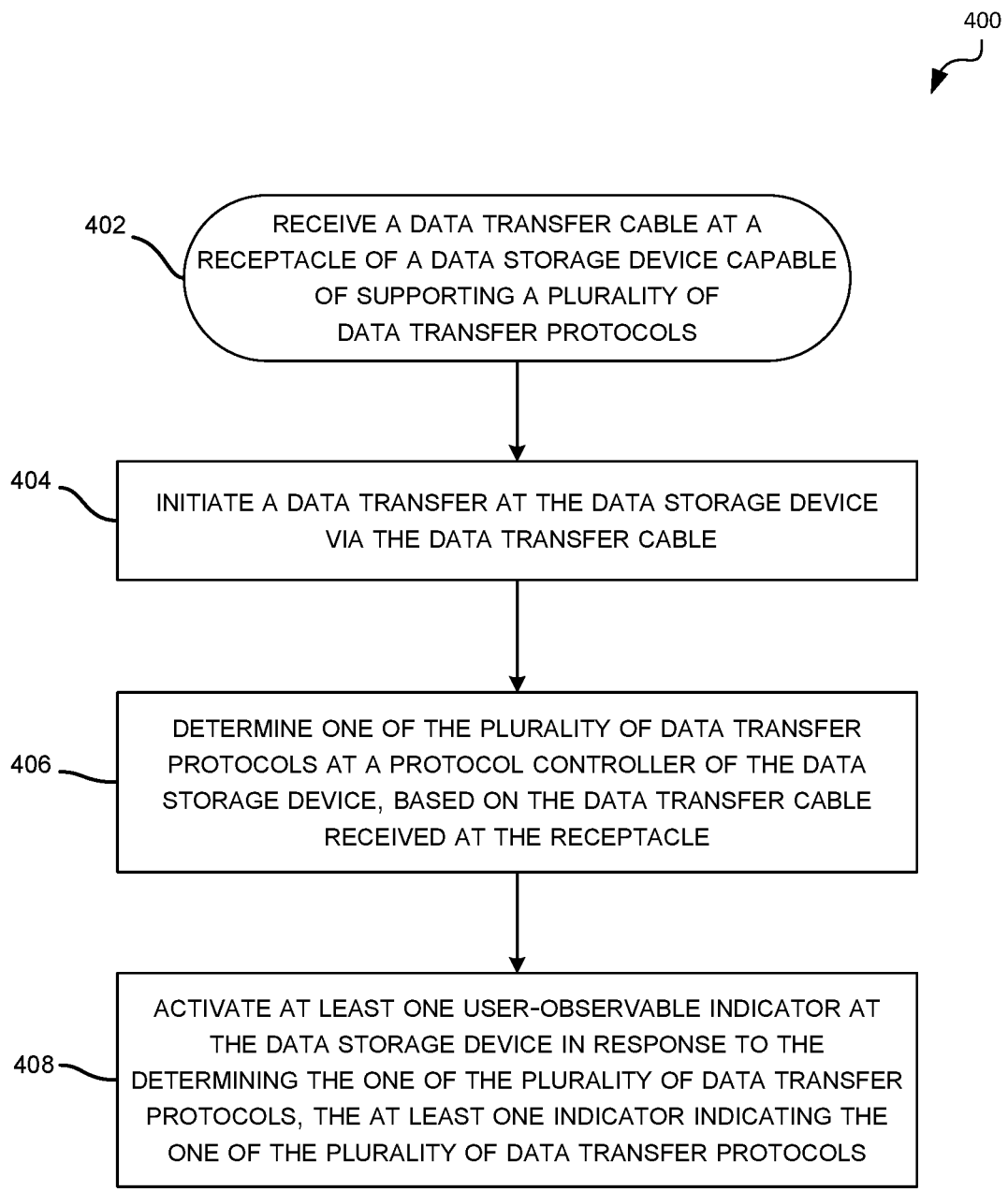
FIG. 4 is a flow diagram illustrating a process for transferring data according to one or more embodiments.

FIG. 4 illustrates a process 400 for indicating which of multiple data transfer protocols is in use during a data transfer between a host computer and a data storage device/drive, according to one or more embodiments disclosed herein. At block 402, the process 400 involves receiving a data transfer cable at a receptacle of a data storage device capable of supporting a plurality of data transfer protocols. In an embodiment, the receptacle is configured to receive any of a plurality of data transfer cables corresponding to the plurality of data transfer protocols. For example, in one embodiment, the receptacle comprises a Type-C receptacle. In the example, the receptacle will accept a Thunderbolt™ 3 or 4 cable, a USB 3.x cable, and one or more other types of cables.

At block 404, the process 400 involves initiating a data transfer at the data storage device via the data transfer cable. In various embodiments, the data transfer can be initiated by user input, at a user interface for instance, or the like. For instance, the data storage device can receive a data transfer initiation input signal at the user interface. In other embodiments, the data transfer can be initiated by the host computer, the data storage device, or the like, on a schedule or as directed by hardware, firmware, software, etc.

At block 406, the process 400 involves determining one of the plurality of data transfer protocols at a protocol controller of the data storage device, based on the data transfer cable received at the receptacle. For example, the protocol is determined based on which of various supported data cables is inserted into the receptacle. The determining can be performed in response to a data transfer initiation input signal in some cases. In an embodiment, the process includes generating a selector signal associated to the one of the plurality of data transfer protocols at the protocol controller in response to the determining the one of the plurality of data transfer protocols.

In an example, the process includes receiving the selector signal at a driver logic component configured to activate the at least one indicator in response to receiving the multiplexer selector signal. In other words, the selector signal generated at the protocol controller is routed to the driver logic component, which activates the indicator(s) to a state corresponding to the selector signal.

In certain embodiments, the process includes performing a data storage operation at a mass storage component of the data storage device. In various implementations, the protocol controller is configured to execute the data transfer over the data transfer cable between the data storage device and a host computer. The determined data transfer protocol is used during the data storage operation. In various examples, a data storage operation may include copying, transferring, synchronizing, or otherwise exchanging data between a memory of the host computer and the mass storage component (e.g., media) of the data storage device.

At block 408, the process 400 involves activating at least one user-observable indicator at the data storage device in response to the determining the one of the plurality of data transfer protocols, the at least one indicator indicating the one of the plurality of data transfer protocols. The activating can be performed in response to a data transfer initiation input signal in some cases. In an embodiment, the process includes indicating, at the at least one user-observable indicator, a protocol version of the one of the plurality of data transfer protocols. In another embodiment, the process includes indicating, at the at least one user-observable indicator, a quantity of data lanes in use during the data transfer.

ADDITIONAL EMBODIMENTS

Those skilled in the art will appreciate that in some embodiments, other types of data transfer methods and systems can be implemented while remaining within the scope of the present disclosure. In addition, the actual steps taken in the processes discussed herein may differ from those described or shown in the figures. Depending on the embodiment, certain of the steps described above may be removed, and/or others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A peripheral data storage device configured to support a plurality of data transfer protocols, the peripheral data storage device comprising:
   a receptacle configured to receive any of a plurality of data transfer cables;
   a protocol controller configured to:
      determine a first data transfer protocol of the plurality of data transfer protocols based on a physical attribute of a first data transfer cable being received at the receptacle that determines a protocol of the first data transfer cable; and
      generate a first selector signal corresponding to the first data transfer protocol; and
   at least one user-observable indicator at the peripheral data storage device configured to be activated to indicate the first data transfer protocol in response to the first selector signal.

2. The peripheral data storage device of claim 1, further comprising a mass storage component communicatively coupled to the receptacle and comprising a storage medium configured to receive and to store data during a data transfer operation.

3. The peripheral data storage device of claim 1, further comprising an indicator driver logic component configured to cause the at least one user-observable indicator to activate to a first state in response to receiving the first selector signal.

4. The peripheral data storage device of claim 3, wherein the indicator driver logic component comprises a transistor.

5. The peripheral data storage device of claim 1, wherein the protocol controller is further configured to:
   determine a second data transfer protocol of the plurality of data transfer protocols based on a second data transfer cable being received at the receptacle; and
   generate a second selector signal corresponding to the second data transfer protocol.

6. The peripheral data storage device of claim 5, further comprising a multiplexer configured to route data from the receptacle to a mass storage component of the peripheral data storage device through one of a plurality of channels of the multiplexer in response to the second selector signal.

7. The peripheral data storage device of claim 5, wherein:
   the first data transfer protocol comprises a Thunderbolt™ protocol; and
   the second data transfer protocol comprises a Universal Serial Bus (USB) protocol.

8. A peripheral data storage device configured to support a plurality of data transfer protocols, the peripheral data storage device comprising:
   a physical enclosure;
   a receptacle disposed at the enclosure and configured to receive any of a plurality of data transfer cables corresponding to any of the plurality of data transfer protocols;
   a non-volatile mass storage memory component disposed within the physical enclosure and coupled to the receptacle via a plurality of data paths;
   a controlling means configured to:
      determine a first data transfer protocol of the plurality of data transfer protocols based on a fixed protocol physical attribute of a first data transfer cable being received at the receptacle;
      generate a first selector signal corresponding to the first data transfer protocol; and
      execute a data transfer operation using the first data transfer protocol; and
   at least one user-observable indicator configured to be activated to a first state in response to the first selector signal, wherein the first state indicates the first data transfer protocol.

9. The peripheral data storage device of claim 8, further comprising a multiplexer configured to route data from the controlling means to the non-volatile memory component through one of the plurality of data paths in response to the first selector signal.

10. The peripheral data storage device of claim 8, further comprising a driver logic component configured to:
   receive the first selector signal; and cause the at least one user-observable indicator to activate to the first state in response to receiving the first selector signal.

11. The peripheral data storage device of claim 10, wherein the driver logic component is configured to cause the at least one user-observable indicator to activate to a second state in response to receiving a second selector signal from the controlling means.

12. The peripheral data storage device of claim 8, further comprising one or more additional user-observable indicators configured to indicate a data transfer protocol version in use and/or a quantity of data transfer lanes in use during a data transfer operation.

13. The peripheral data storage device of claim 8, wherein:
the controlling means is further configured to receive an operation initiation command from a user interface of the peripheral data storage device; and
the first data transfer protocol is determined and the first selector signal is generated in response to the operation initiation command.

14. The peripheral data storage device of claim 8, wherein the at least one user-observable indicator includes a visible indication as well as one or more of a tactile indication and an audible indication.

15. The peripheral data storage device of claim 8, wherein the receptacle comprises a Type-C receptacle.

16. A method, comprising:
receiving a data transfer cable at a receptacle of a peripheral data storage device capable of supporting a plurality of data transfer protocols;
determining one data transfer protocol of the plurality of data transfer protocols by a protocol controller of the peripheral data storage device, based on a protocol determined by a physical attribute of the data transfer cable received at the receptacle; and
activating, by the protocol controller, at least one user-observable indicator at the peripheral data storage device in response to the determining the one data transfer protocol, the at least one user-observable indicator indicating the one data transfer protocol.

17. The method of claim 16, further comprising generating a selector signal associated with the one data transfer protocol at the protocol controller in response to the determining the one data transfer protocol.

18. The method of claim 17, further comprising receiving the selector signal at a driver logic component configured to activate the at least one user-observable indicator in response to receiving the selector signal.

19. The method of claim 16, further comprising indicating, at the at least one user-observable indicator, a quantity of data lanes in use during the data transfer.

20. The method of claim 16, wherein the receptacle is configured to receive any of a plurality of data transfer cables corresponding to the plurality of data transfer protocols.

* * * * *